Nov. 17, 1931.  C. M. PATTISON  1,832,786
HEAT GENERATING APPARATUS FOR HEATING AND POWER PURPOSES
Filed June 15, 1928  4 Sheets-Sheet 1

INVENTOR
C. M. Pattison
BY
ATTORNEYS

Nov. 17, 1931.   C. M. PATTISON   1,832,786
HEAT GENERATING APPARATUS FOR HEATING AND POWER PURPOSES
Filed June 15, 1928   4 Sheets-Sheet 2

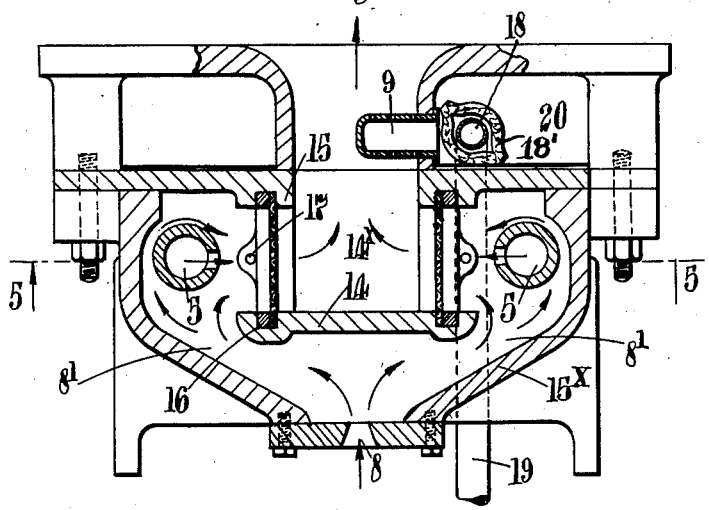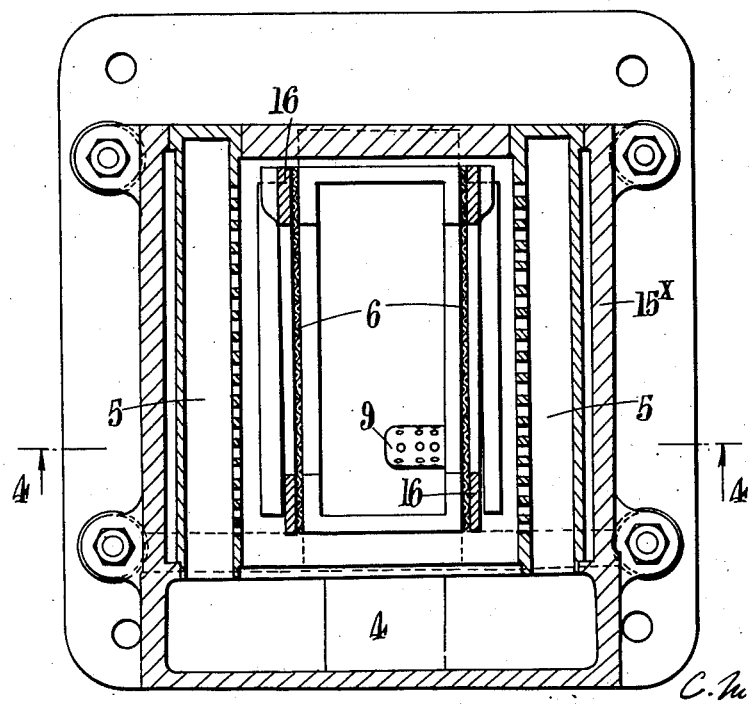

Nov. 17, 1931. C. M. PATTISON 1,832,786
HEAT GENERATING APPARATUS FOR HEATING AND POWER PURPOSES
Filed June 15, 1928 4 Sheets-Sheet 4
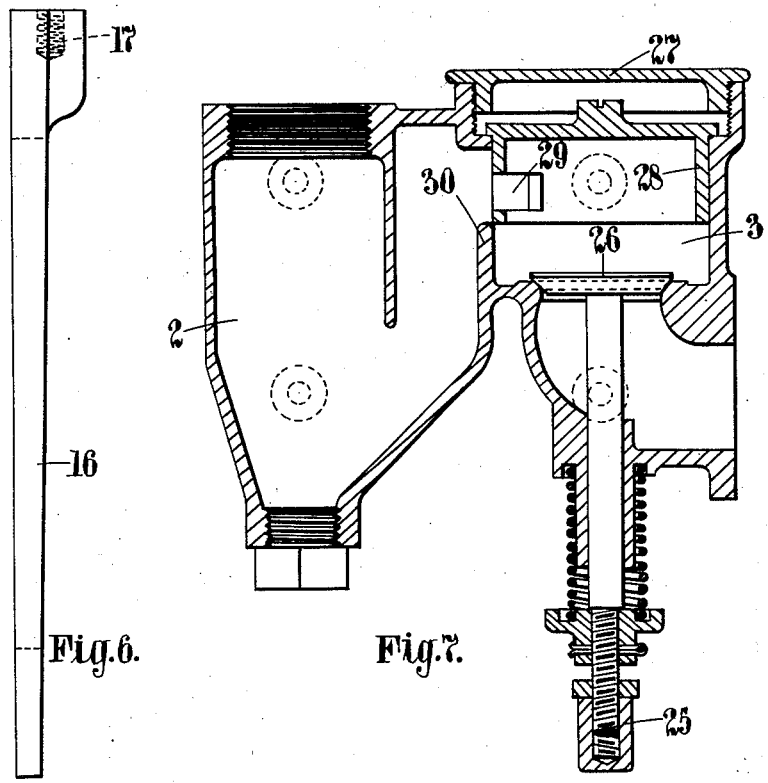
Fig.6. Fig.7.
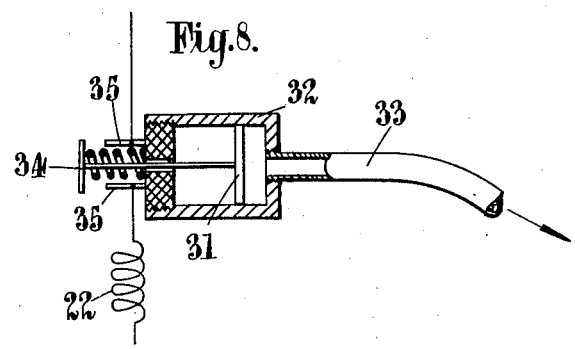
INVENTOR
C. M. Pattison
BY
Langner, Parry, Card & Langner
ATTORNEYS Patented Nov. 17, 1931

1,832,786

UNITED STATES PATENT OFFICE

CHARLES MENSFORTH PATTISON, OF WESTMINSTER, LONDON, ENGLAND

HEAT GENERATING APPARATUS FOR HEATING AND POWER PURPOSES

Application filed June 15, 1928, Serial No. 285,627, and in Great Britain June 16, 1927.

This invention relates to heat generating apparatus for heating and power purposes and has particular reference to comparatively small compact units adapted to be fired by gas or vaporized fuel for maintaining hot-water radiation in buildings although it is also applicable to the production of hot combustion gases for drying and heating purposes generally and to the generation of steam, including steam generation in high pressure boilers of the multi-tubular type.

The type of plant to which the present invention has reference comprises a combustion chamber in which is burned the gas or other fuel admixed with air, passages in which the products of combustion are circulated, and a temperature or pressure controlled switch mechanism responsive to the temperature or pressure created by the circulating products of combustion and adapted to automatically cause the supply of air to be stopped and the gas or fuel supply to be cut off whenever a predetermined maximum temperature or pressure is exceeded and restores the gas or fuel supply as soon as the temperature or pressure drops below the maximum.

The chief objects of the present invention are to provide an improved plant of the kind referred to and in particular to render it simple to keep in order, efficient in action and free from all dangers arising from possible failure of any portion of the automatic system.

With the above objects in view and such others as are incidental thereto or hereinafter appear, the main feature of the present invention consists in the employment of a gas and air preheating and mixing head or chamber having an external continuously burning pilot flame which, during inaction of the fan and absence of gas flow, as for example during intervals of slight over-heating, serves to keep the walls of the chamber hot in readiness for pre-heating of the gas and air during subsequent action. During operation of the plant the flame is drawn inwards through a hollow refractory perforated plug projecting inwardly through the wall of the combustion chamber into the path of the preheated gas and air and thereby ensures its ignition and combustion at all times. This jet burning externally may be surrounded by a refractory element of fireclay or the like as used in domestic gas stoves.

The air is preferably admitted through a long narrow passage of fixed size and is made to sweep around the gas inlet pipe or pipes so that the gas and air become well mixed as they impinge on and penetrate through suitable gauzes into the ignition zone of the combustion chamber. The gas inlets are preferably in the form of a single row of perforations in each gas inlet pipe, positioned to direct the issuing jets towards the gauzes.

An electromagnetic switch preferably of the solenoid type is provided to cut off or open up the fuel supply that is to say to close or open a main fuel control valve i. e. the gas valve in the case of using gas. This solenoid is preferably provided with a one-way delay-action attachment such as a dash-pot so that if, as is preferred, the air supply fan is driven by an electric motor energized from a source which also energizes the solenoid, the fan will have built up a considerable draft before the gas valve is opened.

The solenoid circuit is preferably operated through a safety switch which is held closed under the influence of the draft but automatically opens and thereby breaks the solenoid circuit and thus causes the gas to be instantly shut off if the fan should stop.

In order that the invention may be clearly understood and readily carried into effect I will now describe the same more fully with reference to the accompanying drawings which illustrate a gas fired water heating installation in accordance with the present invention.

In these drawings:—

Figure 4 is a sectional plan taken on the line 4—4 of Figure 5 showing the gas and air preheating mixing and ignition chamber and Figure 5 is a vertical sectional elevation on the line 5—5 of Figure 4.

Figure 6 is a vertical edge view of a wedge plate to keep the gauzes tightly in position.

Figure 7 is an enlarged vertical section through the gas valve.

Figure 8 is a diagrammatic detail hereinafter referred to.

Figure 1:
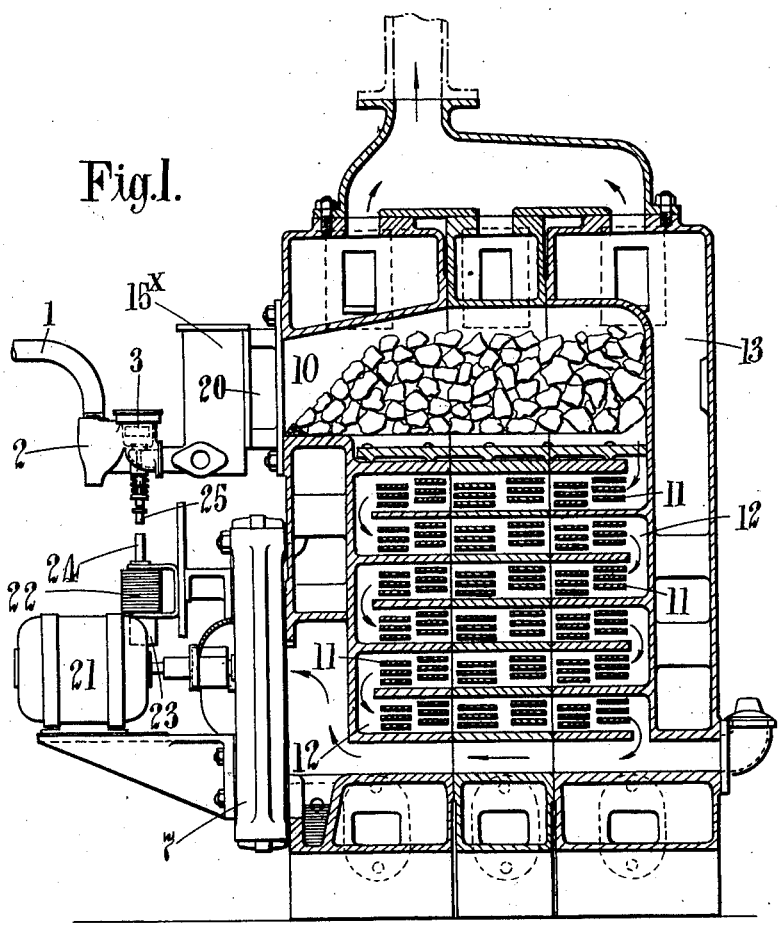
Figure 1 is a sectional side elevation of the plant as used for generating hot water or steam in a boiler.
Figure 2:
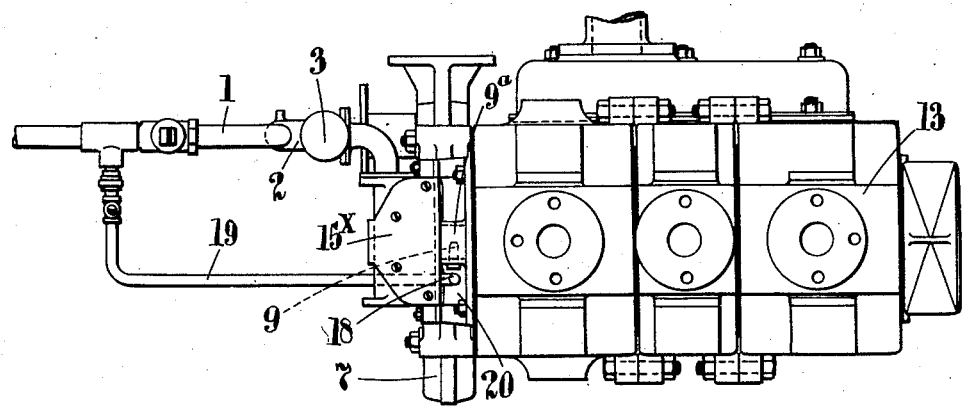
Figure 2 is a corresponding plan view.
Figure 3:
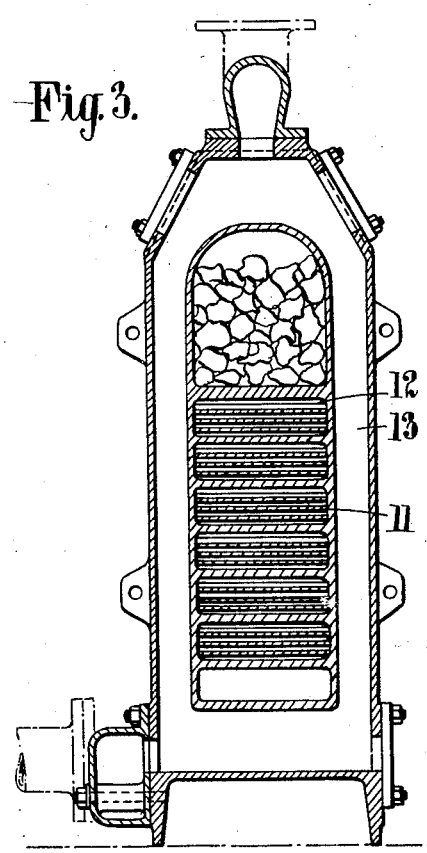
Figure 3 is a vertical cross section.

During operation of the plant the gas enters through the gas supply pipe 1, gas trap or baffle 2 and gas valve 3 and passes into the gas chest 4. It then ascends the gas jet pipes 5, 5, and impinges on the gauze mixing screens 6, 6. Meanwhile air induced by the suction fan 7 enters through the air inlet port 8 into a space between a casing 15˟ and a reentrant portion comprising the rear wall or head 14 and the side walls 15, the latter being apertured to serve as holders of reticulated material such as gauze screens. After meeting the wall or head 14, the air sweeps around the gas jet pipes 5, 5, and mixes with the gas as the gas and air pass through the gauze screens. The mixture then flows over the hollow perforated refractory plug 9 which is situated in the ignition zone 9a of the combustion chamber 10 and causes and maintains the combustion of the mixture. The flame extends into the combustion chamber 10 which is preferably charged with refractory material, and the products of combustion traverse downwardly a zig-zag course over heat-absorbing fins or bars 11 in the water-jacketed passages 12 of the boiler proper 13.

The general construction and operation of the boiler will be understood from inspection of the drawings, but it is important to note that according to the preferred construction shown the boiler body is built up of vertical sections and that the products of combustion travel downwardly across the upper and lower faces of horizontally staggered fins or bars 11 extending completely across the passages from wall to wall and not merely projecting from one or other wall.

Referring particularly to Figures 4 and 5 it is to be observed that the air inlet port 8 is an elongated slit and that the solid head 14 of the gauze holder 15 heats and diverts the entering air which then sweeps along the space between the gauze holder 15 and the cover or casing 15˟ and around and in front of the gas jet pipes 5, 5. The mixing gauze screens 6, several of which may be used together in compacted form, may be secured in position in the gauze holder 15 by wedging frames 16 tapped as at 17 or otherwise shaped to permit of their being easily removed by means of a simple tool.

The pilot jet orifice 18 is supplied with gas through a bye-pass pipe 19 so that a pilot flame burns continuously. When the fan is not working, the pilot flame extends upwardly in the space 20 just outside the gauze holder 15, and is preferably surrounded by a refractory heating element 18′ as already mentioned; and when the fan is working, the flame is drawn laterally into the perforated ignition plug 9.

As will be understood, the gauze holder 15 and more particularly the solid head 14 thereof will become hot during normal operation of the plant. Moreover when the fan is not working, the pilot jet from the orifice 18 is burning upwardly in the space 20 and the parts adjacent thereto will therefore be maintained hot. The two-way space 8′ between the casing 15˟ and the gauze holder 15, and the space 14˟ within the gauze holder immediately past the gauze screens 6, therefore constitute a gas and air preheating and mixing chamber, and the gauze holder itself and its casing 15˟ constitute what may be termed a gas and air preheating and mixing head.

The suction fan 7 is driven by a constant speed electric motor 21 (Figure 1) supplied by current from any convenient source, and the solenoid 22 controlling the gas valve 3 is supplied from the same circuit. The solenoid 22 is provided with any customary or suitable form of dash pot 23 to delay the rising of the plunger 24 when the solenoid becomes energized. As the plunger eventually ascends it strikes the stem 25 of the gas valve and thereby raises the valve head 26 away from its seat so that the gas may flow. The delayed action enables the fan to attain a considerable speed and thereby build up a considerable air draft before the gas is turned on.

The circuit of the motor 21 and solenoid 22 is controlled by any convenient or known form of thermostat or pressure gauge controlling an automatic temperature or pressure controlled switch.

It it is desired to regulate the rate of flow of gas at any time, the cover 27 (Figure 7) of the gas valve may be unscrewed and the ring 28 may be adjusted angularly to change the degree of register of its port 29 with the gas inlet passage 30.

From the foregoing description it will be realized that the plant illustrated is a simple, efficient, self regulating water heater. To start up the plant, the pilot jet is lit, and the temperature or pressure controlled switch is moved into its energizing position. The motor then speeds up and drives the fan, and after a suitable pause the solenoid opens the gas valve, and the pilot jet is drawn laterally and ignites the gas and air mixture. If the water becomes too hot or the steam pressure too high, the electric motor and the solenoid become de-energized and when the temperature or pressure drops below a certain degree, the temperature or pressure controlled switch agains closes the motor and solenoid circuits.

As hereinbefore stated, the circuit of the solenoid is preferably completed through a switch closed by the suction of the fan, so that if the fan should stop or fail, the solenoid would become de-energized and the gas valve closed. As shown diagrammatically in Figture 8, this safety switch may for example consist of a double diaphragm or piston arrangement, one piston 31 being in a cylinder 32 connected by a pipe 33 with the suction side of the fan, and the other piston 34 serving to bridge across two insulated studs 35 in the solenoid circuit, when the suction on the piston 31 is sufficient to shift both pistons and thereby move the other piston 34 into bridging contact with the studs 35.

It is to be understood that two or more units as hereinbefore described may be employed side by side to work entirely independently of one another or to heat a single body of water common to all.

What I claim is:—

1. Gas combustion apparatus comprising an open-ended gas and air ignition chamber, a pilot gas burner external but close to said chamber, and a hollow perforated refractory plug extending into said chamber from an aperture in the chamber wall adjacent said pilot burner, in combination with a gas and air preheating and mixing head adjacent the rear end of said ignition chamber and comprising a solid outer casing having a re-entrant portion constituting a rearward extension of the ignition chamber, said re-entrant portion having side walls and a rear wall, reticulated material covering an aperture in each side wall of the re-entrant portion, and multi-jet gas supply piping located adjacent said material in the space between the outer casing and its re-entrant portion, said outer casing having an air admission aperture opposite the rear wall of the re-entrant portion, whereby the entering air is diverted laterally towards and around the gas supply piping and thence past the same to and through the reticulated material and into the ignition chamber.

2. Gas combustion apparatus according to claim 1, in combination with an element of refractory material surrounding the pilot jet and located external but close to the gas and air preheating and mixing chamber, whereby the latter is kept hot while the apparatus is idle.

3. Gas combustion apparatus according to claim 1, wherein the multi-jet gas supply piping has its outlets directed perpendicularly towards the reticulated material.

4. Gas combustion apparatus according to claim 1, including a detachable plate constituting the part of the casing facing the rear wall of the re-entrant portion, said plate being formed with a narrow rectangular air-admitting slit extending in a direction parallel with the axes of the gas supply piping adjacent the reticulated material in the side walls of said re-entrant portion.

In testimony whereof I have signed my name to this specification.

CHARLES MENSFORTH PATTISON.